United States Patent [19]

Hellyer et al.

[11] 3,949,102

[45] Apr. 6, 1976

[54] FROZEN DESSERT PRODUCT AND PROCESS

[75] Inventors: James Allen Hellyer, Milford; Richard Gordon Kess, Greenhills; Paul Seiden, Cincinnati, all of Ohio

[73] Assignee: The Procter & Gamble Company, Cincinnati, Ohio

[22] Filed: June 30, 1975

[21] Appl. No.: 592,008

[52] U.S. Cl. .............................. 426/566; 426/565
[51] Int. Cl.² ........................................... A23G 9/00
[58] Field of Search .................... 426/564, 566, 565

[56] References Cited
UNITED STATES PATENTS

| | | |
|---|---|---|
| 2,821,480 | 1/1958 | Hilker ............................... 426/566 |
| 3,124,464 | 3/1964 | Knightly et al. ..................... 426/566 |
| 3,800,036 | 3/1974 | Gabby et al. ....................... 426/566 |
| 3,806,605 | 4/1974 | Patterson .......................... 426/564 |

*Primary Examiner*—Jeanette M. Hunter

[57] ABSTRACT

A frozen dessert having good texture and eating quality is made by mixing and then freezing from about 7% to about 18% protein solids and from about 10% to about 40% saccharides with from about 5% to about 25% of a triglyceride fat or oil, from about 0.2% to about 2% of a primary emulsifier which is either a polyglycerol ester or a sorbitan ester, from about 0.5% to about 15% by weight of the primary emulsifier of a secondary emulsifier which is an edible anionic surfactant, and with from about 45% to about 65% water.

15 Claims, No Drawings

FROZEN DESSERT PRODUCT AND PROCESS

FIELD OF THE INVENTION

This invention relates to a process for making a frozen dessert and the frozen dessert product made by the process.

BACKGROUND OF THE INVENTION

There are many difficulties inherent in the preparation of frozen desserts which are made by a process employing static freezing. Static freezing refers to the process step of freezing without concurrent agitation or aeration. Generally, frozen desserts made by static freezing do not compare in consistency and overall appearance to conventional frozen desserts made by the normal commercial process which involves agitation during the freezing process. Ordinarily, if frozen desserts formlations are not agitated during freezing large ice crystals are formed. Also, the fat base will tend to separate from the other components of the mix yielding a non-homogeneous product. Such results adversely affect texture, dryness, uniformity of appearance of the frozen dessert thereby affecting the overall quality of the product.

The normal commercial process for preparing frozen desserts involves mixing, pasteurizing and homogenizing the ingredients to form an emulsion which is then cooled with agitation with concurrent aeration and solidification to form a frozen dessert. The frozen dessert may be held at a lower temperature to "harden" the product and is then maintained at a temperature below about 30°F in order to maintain its hard consistency. Failure to maintain the dessert at relatively low temperature results in the development of large crystals of the sugar lactose and/or of ice which degrade the quality of the product.

It is apparent that it would be highly desirable to be able to make a frozen dessert product having good qualities from a shelf-stable mix by simply whipping conveniently available ingredients in a home mixer and then static freezing the aerated mixture in the freezing compartment of a home refrigerator or freezer without agitation. It would be even more desirable if such a product could be thawed or melted and then, without aeration, refrozen to provide a frozen dessert still having the good consistency, texture, flavor and overall appearance the product had before melting. This quality of retaining product characteristics during temperature cycling is referred to as freeze-thaw stability.

While much product development work has been conducted in the frozen dessert field, there remains a need for a high quality frozen dessert which can be conveniently prepared by the consumer with a minimum amount of equipment, effort, and expertise concerning methods for preparing frozen desserts. The prior art teaches compositions and processes for making frozen dessert products both with and without agitation during freezing and products which can be made by relatively simple process steps. Examples of prior art in this field include: U.S. Pat. No. 3,800,036, Mar. 26, 1974, to Gabby et al. and U.S. Pat. No. 3,183,098, May 11, 1965, to Baur.

It is well known in the art that each ingredient of a frozen dessert composition affects and contributes to the overall quality of the frozen dessert and that frozen dessert processing can be quite complex. Although each ingredient has a separate function, each also interacts with each other ingredient to form a final product with characteristics that would have been difficult or impossible to predict from the known properties of each individual ingredient. Thus, one of the objects of the present invention is to provide a novel combination of ingredients which, when combined, agitated and then frozen interact with each other to provide a tasteful, highly aerated frozen dessert having good appearance, dryness, body, flavor and eating qualities.

Another object of the present invention is to provide a frozen dessert having good qualities which are retained even when the dessert is thawed and then refrozen without agitation. That is, it is an object of this invention to provide a product having freeze-thaw stability.

It is a further object of this invention to provide a frozen dessert which can be made by convenient process which does not require agitation during the freezing step. That is, it is an object of this invention to provide a frozen dessert which can be made by static freezing.

It is yet another object of this invention to provide a frozen dessert which can be conveniently prepared in the home. More specifically, it is an object of this invention to provide a frozen dessert which can be prepared in the home without employing a heating step, or unusual or expensive utensels or equipment or an extended whipping time.

Still another object of this invention is to provide a frozen dessert made from mix ingredients which are shelf stable with respect to functional and microbiological deterioration.

These and still other objects will be apparent from the following description of the present invention.

SUMMARY OF THE INVENTION

It has been discovered that a high quality frozen dessert can be conveniently made in the home by employing the ingredients and methods of the present invention.

A frozen dessert having good appearance, dryness, body, flavor and eating quality characteritcs is made by:

a. making an emulsion by the steps of
  1. melting from about 0.5 parts to about 18 parts of a first emulsifier selected from the group consisting of edible polyglycerol fatty acid esters and edible sorbitan fatty acid esters, with from about 0.5% to about 15% by weight of said first emulsifier of a second emulsifier which is an anionic surfactant,
  2. dispersing without aeration the melt of step (1) with high shear and cooling to below the crystal melting point of said melt into an aqueous medium of at least twice the weight of said melt; and
  3. emlsifying from about 15% to about 80% of a triglyceride fat or oil into the aqueous dispersion of (2); said emulsion having a water activity of less than 0.80;

b. mixing from about 10% to about 35% of said emulsion of step (a), from about 10% to about 35% of saccharides, from about 7% to about 18% of nonfat milk solids and from about 35% to about 65% of water;

c. aerating the mixture of step (b)

d. freezing the aerated mixture of step (c).

Addition ingredients such as stabilizers, flavors, coloring agents, etc. can be added to the frozen dessert product by incorporating the ingredients into the emulsion or the mixture of ingredients prior to, or during the aeration step.

The resulting frozen dessert product comprises from about 7% to about 18% mild solids, from about 10% to about 40% saccharides, from about 0.2% to about 2% of a primary emulsifier selected from the group consisting of edible polyglycerol fatty acid esters and edible sorbitan fatty acid esters, from about 0.5% to about 15% by weight of the primary emulsifier of a secondary emulsifier which is an anionic surfactant, from about 45% to about 65% water, and from about 5% to about 25% of a triglyceride fat or oil.

Polyglycerol esters suitable for use in the present invention have an average of from 2 to 10 glycerol units and from 1 to 3 fatty acyl groups of from 14 to 18 carbon atoms per glycerol moiety. Preferred polyglycerol esters have an average of 2 or 3 glycerol units and 1 fatty acyl group having from 14 to 18 carbon atoms per polyglycerol moiety.

Sorbitan esters suitable for use in the present invention have from 1 to 3 fatty acyl groups having from about 14 to about 18 carbon atoms each. Preferred sorbitan esters have one fatty acyl groups having 14 to 18 carbon atoms.

Examples of anionic emulsifier suitable for use in the present invention include the alkali and alkaline earth metal salts of fatty carboxylates, sulfates, and sulphonates, half salts of dicarboxyllic fatty acid esters and salts of fatty acid lactylates having from 8 to about 20 carbon atoms in the anionic moiety.

Triglyceride fats or oils are employed in the frozen desserts of the present invention to contribute to the smooth taste, minimize the formation of ice crystals, and to give the full, rich, creamy eating characteristic reminiscient of good commercial ice cream. The fat or oil contributes to the body and melting resistance of the frozen dessert and produces a smoothness of texture and consistency that is difficult to obtain by any other means. Within the range of from about 5% to about 25%, the exact amount of fat is not critical and can be minimized to obtain a low fat frozen dessert which might be desirable for dietary reasons. However, if the fat proportion of the frozen dessert is reduced, there must be a corresponding increase in the other ingredients contributing to the total solids content of the dessert in order that the frozen dessert product will have a solids content of from about 35% to about 55%.

The fat or oil which is used in the compositions described herein must, of course, be edible and can be a solid fat so long as it will melt easily in the mouth thereby not contributing a waxy taste to the frozen dessert when it is eaten. Suitable solid fats will be 85% melted, i.e., have less than 15% solids, at a temperature of 37°C. In general, edible fats and oils suitable for use in this invention contain fatty acids having from 4 to 26, and preferably 8 to 22 carbon atoms. Examples of suitable fats and oils include: cottonseed oil, soybean oil, corn oil, subflower oil, palm oil, palm kernel oil, peanut oil, olive oil, rice oil, safflower oil, and coconut oil. These fats and oils may be partially or substantially hydrogenated to improve their melting behavior and keeping quality. The fat or oil component of the present invention may consist of fats or oils derived from two or more sources rather than a single source.

Other fats or oils including those of animal origin such as milk fat or marine fats and oils such as are obtained from whale oil, sardine oil, herring oil, and menhaden oil, can be used, provided they have melting points and keeping quality which would give them the desirable properties hereinbefore indicated.

The nonfat milk solids which are used in the compositions of this invention are the solids of skim milk and include proteins, mineral matter, and milk sugar. Milk sugars add to the sweet taste of the frozen dessert and proteins aid overrun. Overrun is a measure of the increase in volume which occurs during the agitation process. Proteins also help to make the frozen dessert smoother and serve as bodying ingredients as well as contributing to the texture and mouth feel of the frozen dessert. The nonfat milk solids increase the effect whipping has on the frozen dessert and increases the viscosity and resistance to melting of the composition. The nonfat milk solids also tend to lower the freezing point of the dessert. The preferred nonfat milk solids for use in this invention are those of the "instant" type. "Instant" refers to the fact that the powders disperse easily and quickly in water or milk without forming lumps. These can be produced by spray drying the solids in a dehydration chamber. Nonfat milk solids may also be supplied by replacement of the water with milk in the mixing process of this invention.

While nonfat milk solids are preferred as the protein source for use in this invention, other proteins may be substituted for nonfat milk solids. Examples of suitable proteins include: casein, sodium caseinate, calcium caseinate, modified casein, sweet dairy whey, modified whey, whey protein concentrate, soy isolate, soy concentrate, soy flour, modified soy flour, peanut flour, peanut concentrate, corn and other starches. Lactose and mineral salts present in nonfat milk solids can be added separately when other proteins are used.

The saccharides suitable for use in this invention not only have a sweetening effect, but also enhance the creamy flavor or texture of the composition. An insufficient amount of saccharide contributes to an undesirable fatty taste in the composition, while too much saccharide masks the other desirable flavors and may be too sweet. The saccharides also lower the freezing point of the dessert to various degrees, depending on the molecular weights of the particular saccharides used. The preferred saccharide for use in this inventon is sucrose; however, sucrose can be mixed with or replaced by other saccharides such as dextrose, fructose, maltose, and corn syrup in dry or syrup form or by artificial sweeteners such as saccharin, the cyclamates, etc. It has been found that the most desirable level of sweetness and texture may be obtained by employing sucrose in combination with a sugar which is less sweet such as dextrose, maltose or low-conversion corn syrup to obtain a relatively great proportion of sugar at a level of sweetness less than that which would result from the use of sucrose alone.

The frozen dessert product may also contain additional ingredients such as lower chain monohydric and polyhydric alcohols, starches, gums or colloidal carbohydrate stabilizers, and alkali and alkaline earth metal salts of organic and inorganic acids. In addition, flavoring ingredients, pH buffering salts, antioxidants, and preservatives may be incorporated into the final dessert product. Additional emulsifiers may also be incorporated provided they do not cause instability of the primary emulsifier.

The frozen dessert product of the present invention is made in accordance with the following process. It will be noted that any final steps necessary to make the frozen dessert contemplated to be carried out by the consumer are exceptionally consumer-tolerant steps. In other words, consumers will be able to easily and conveniently carry out the final steps to obtain frozen dessert products which are of consistently good quality. This is a great advantage in commercially bringing this invention to the consumer. In particular, it should be noted that the compositions of this invention are relatively tolerant to the inclusion of additional ingredients without loss of the advantages of the invention. Further, not only is the addition of cold, i.e. from about 0°C to about 20°C, liquid suitable for subsequent aeration but this temperature, although an advantage of the invention, is not critical to subsequent aeration and liquid of a higher temperature is also satisfactory.

First, an emulsion is formed by melting from about 0.5% to about 18% of a first emulsifier as defined hereinbefore and from about 0.5% to about 15% by weight of the first emulsifier of a second emulsifier as hereinbefore defined. Second, dispersing this melt with high shear and cooling and without aeration, said shearing and cooling being done either simultaneously or in sequence, into an aqueous medium to form an aqueous dispersion, the aqueous medium present in an amount equal to at least twice the weight of the melt. Third, emulsifying a suitable triglyceride into the aqueous dispersion. The resulting emulsion should either be aseptically prepared or should have a water activity of less than 0.80 in order to provide microbiological stability. The term water activity is used here in accordance with the definition provided in Frazier, Wm. Carroll, *Food Microbiology* (2nd Ed.), McGraw-Hill Book Co., New York, 1967. The desired water activity may be obtained by the reduction of the water content or the addition of water-binding ingredients into the emulsion. Suitable additional ingredients include starches, corn syrup solids, saccharides, gums or carbohydrate colloidal gel stabilizers, or proteins and lower chain monohydric and polyhydric alcohols, such as ethanol and glycerine.

In forming the emulsion, it is required that the emulsifier be in liquid form and then subjected to high shear prior to or during cooling. This is necessary to provide the high functionality required of the emulsifier in the present invention. Additional ingredients which may be added to the emulsion, for example, fat or oil is preferably added at a temperature below the melting point of the emulsifier crystals. Should a higher temperature be employed there is a tendency to decrease the functionality of the emulsifier and, hence, there will be a reduction in the quality of the final frozen dessert product.

The emulsion is then mixed with sufficient saccharides sufficient protein, and sufficient aqueous liquid to provide a mixture having from about 10% to about 40% saccharides, from about 2% to about 7protein, and from about 45% to about 65% water. The resulting mixture is then aerated, for example, by whipping with a home mixer at high speed for from about 1 to about 3 minutes. Aeration should be continued until about 75% overrun is achieved. The term overrun refers to the percentage of increase in volume of the mixture. By making frozen desserts in accordance with the present invention frozen desserts having densities similar to those of ice cream, ice milk, or an ice cream shake are obtained. These densities range from 0.5 to 0.9 with a density of about 0.6 g./cc. being preferred for ice cream.

The aerated mixture is then cooled to below a temperature of −7°C to harden the dessert. While it is contemplated that the dessert will be consumed in its hardened or frozen form, it is an advantage of the present invention that the product is freeze-thaw stable. Thus, the aerated mixture may be frozen, thawed and refrozen to form a product having highly desirable frozen dessert characteristics.

It is a particular advantage of the present invention that the ingredients can be conveniently provided to the consumer in such a way as to make it especially convenient for the consumer to make consistently good frozen dessert products. For example, it is contemplated that a manufacturer provide a kit of two packages for sale to the consumer. The first kit contains an emulsion made in accordance with step (a) of the process of the present invention. In a preferred embodiment of the present invention, the pre-emulsion contains from about 5% to about 20% levulose, from about 5% to about 45% sucrose, from 2% to about 6% of triglycerol monostearate, from about 0.02% to about 0.24% sodium oleate, from about 30% to about 60% of a triglyceride fat having less than 10% solids at 37°C, from about 0.01% to about 0.25% of a stabilizer selected from the group consisting of xanthan gum, guar gum, hydroxypropyl cellulose, sodium carboxymethyl cellulose and from about 5% to about 25% water.

The second packet comprises from about 60% to about 85% sugar and from about 15% to about 30% of nonfat milk solids. If desired, other protein could be substituted for nonfat milk solids. Suitable examples of proteins which could be substituted for nonfat milk solids are soy protein isolate, modified whey and sodium caseinate. In a preferred embodiment of the present invention the second mix comprises from about 15% to about 40% corn syrup solids, from about 0% to about 30% dextrose, from about 5% to about 50% sucrose, from about 15% to about 30% nonfat milk solids, from about 0% to about 20% of a triglyceride fat having less than 10% solids at 37°C., from about 0% to about 3% of a monoester of an aliphatic polyhydric alcohol having 3 carbon atoms in the alcohol moiety and from 16 to 18 carbon atoms in the fatty acid moity, from 0.1 % to about 2 % of stabilizers selected from the group consisting of xanthan gum, locust bean gum, guar gum, tum tragacanth, carrageenan, gelatin, hydroxypropyl cellulose, and sodium carboxymethyl cellulose and a minor amount of coloring agent. These two packets are shelf-stable and may be stored for an extended period of time.

It is contemplated that the consumer would purchase the two packets and then proceed to mix the ingredients of the two mixes with milk or water and then aerate by whipping with a home mixer and place in the freezing compartment of a home refrigerator or freezer and subject to static freezing.

The following examples are intended to illustrate the present invention but not to act as a limitation thereof.

EXAMPLE 1

58.3 g. of triglycerol monostearate (Paniplus 504 from the Paniplus Company) was melted with 0.87 g. of sodium oleate by heating to a temperature of 104°C. This melt was then placed in a stainless steel beaker with 767.4 g. of high fructose corn syrup (Isomerose 100 from the Clinton Corn Processing Company) having a temperature of 60°C and subjected to high shear. The sheared mix was cooled to 32°C. Then 813.8 g. of a triglyceride oil (Crisco Oil from the Procter & Gamble Company) at a temperature of 32°C was blended into the emulsifier-water dispersion and subjected to additional high shear. The resulting product was a homogeneous emulsion suitable for use, when mixed with additional water or milk, nonfat milk solids and saccharides, to make frozen desserts having good eating quality characteristics, texture, appearance and flavor.

EXAMPLE 2

109.4 g. of the emulsion of Example 1 was blended in a home mixer running at high speed with 278.7 g. of ice water, 93.9 g. nonfat milk solids, and 105.0 g. of sucrose for about 2 minutes. The resulting aerated mixture had an overrun of about 75%. The aerated mixture was then placed in a freezing compartment at a temperature of about −18°C for about 5 hours. The resulting product was a frozen dessert which had a density of about 0.62 g./cc. and had good texture and appearance.

EXAMPLE 3

58.3 g. of triglycerol monostearate (Paniplus 504 from the Paniplus Company) was melted with 0.87 g. of sodium lauryl sulfate by heating to a temperature of 63°C. This melt was then placed in a stainless steel beaker with 741.8 g. of syrup (592.0 g. Isomerose 100, 99.0 g. sucrose, 50.8 g. of water) having a temperature of 60°C and subjected to high shear. The sheared mix was cooled to 32°C. 0.3 g. of xanthan gum was dispersed in 196.4 g. of glycerine and the combination was blended into the emulsifier-syrup dispersion. Then 436.3 g. of the stearine fraction of winterized soybean oil at a temperature of 43°C was added and the total mixture was subjected to high shear. 59.8 g. of ethanolic vanilla extract was then blended into the mixture at a temperature of 32°C. The resulting emulsion had low air incorporation; was homogeneous, had low water activity and was particularly suitable for use to make frozen desserts having good eating quality characteristics, texture and flavor.

EXAMPLE 4

99.6 g. of the emulsion of Example 3 was mixed with 312.3 g. of 2% fat milk at a temperature of 4°C, and 44.8 g. of dry mix consisting of low-conversion (DE15) corn syrup solids, 38.7 g. of extrose, 24.0 g. of sucrose, 37.3 g. of nonfat milk solids, 25.2 g. of the stearine fraction of winterized soybean oil, 3.4 g. of propylene glycol monopalmitate, 0.03 g. of butter flavor, 0.3 g. of locust bean gum, 0.8 g. of xanthan gum, 0.4 g. of sodium chloride, and a minor amount of coloring agent. This mixture was whipped for about 2 minutes with a home mixer at high speed (875 rpm) to achieve a overrun of about 75%. This aerated mixture was then cooled at −18°C for 5 hours. The resulting product had a density of about 0.62 g./cc. and had good eating quality characteristics, texture, appearance, and flavor.

EXAMPLE 5

64.7 g. of sorbitan monostearate (Span 60 from ICI America, Inc.) was melted with 0.98 g. of sodium lauryl sulfate by heating to a temperature of 63°C. This melt was then placed in the water-jacketed bowl of a Kitchen Aid mixer, equipped with a wire whip, with 850.4 g. of syrup (603.6 g. of sucrose, 246.8 g. of water) having a temperature of 63°C. The mix was sheared at Speed 4 until the mix temperature had cooled to 43°C. Water was circulated through the jacket and the mix was agitated at Speed 2 until the mix temperature had cooled to 32°C. 484.0 g. of Crisco Oil was added and the mix was sheared at Speed 10 for 2 minutes. The resulting emulsion had a density of 0.52 g./cc., was homogeneous, and was suitable for use, when mixed with additional water or milk, nonfat milk solids and saccharides, to make frozen desserts having good eating quality characteristics, texture, appearance and flavor.

EXAMPLE 6

83.8 g. of the emulsion of Example 5 was mixed with 316.2 g. of 2% fat milk at temperature of 4°C, and a dry mix consisting of 49.8 g. of corn syrup solids (DE36), 49.8 g. of corn syrup solids (DE42), 34.3 g. of dextrose, 15.8 g. of nonfat milk solids, 25.3 g. of Crisco Oil, 3.3 g. of propylene glycol monopalmitate, 0.9 g. of xanthan gum, 0.6 g. of guar gum, 0.3 g. of locust bean gum, 0.6 g. of salt, 5.9 g. of ethanolic vanilla extract and a minor amount of coloring agent. This mixture was whipped for about 3 minutes with a home mixer at high speed (875 rpm) to achieve an overrun of about 64%. This aerated mixture was then cooled at −18°C for 5 hours. The resulting product had a density of about 0.66 g./cc. and had good eating quality characteristics, texture, appearance, and flavor.

What is claimed is:

1. A frozen dessert composition comprising:
   a. from about 2% to about 7% protein solids;
   b. from about 5% to about 25% of an edible triglyceride;
   c. from about 0.2% to about 2% of a first emulsifier selected from the group consisting of edible polyglycerol fatty acid esters having an average of from 2 to 10 glycerol units and from 1 to 3 fatty acid groups of from 14 to 18 carbon atoms per polyglycerol moiety and sorbitan fatty acid esters having from 1 to 3 fatty acid groups of from 14 to 18 carbon atoms per sorbitan moiety;
   d. from about 0.5% to about 15% by weight of said first emulsifier of a second emulsifier which is an edible anionic surfactant;
   e. from about 10% to about 40% of saccharides; and
   f. from about 45% to about 65% of water.

2. The frozen dessert of claim 1 wherein:
   a. said protein solids are provided by nonfat milk solids;
   b. said edible triglyceride is selected from the group consisting of cottonseed oil, soybean oil, corn oil, sunflower oil, palm oil, palm kernel oil, peanut oil, rice oil, safflower oil, and coconut oil;
   c. said first emulsifier is selected from the group consisting of an edible polyglycerol fatty acid ester having an average of 2 to 3 glycerol units and 1 fatty acid group per polyglycerol moiety and edible sorbitan fatty acid esters having one fatty acid group per sorbitan moiety;
   d. said second emulsifier is an anionic emulsifier selected from the group consisting of alkali and alkaline earth metal salts of fatty carboxylates, sulfates, sulfonates, fatty acid lactylates and half salts of dicarboxylic fatty acid esters having from about 8 to about 20 carbon atoms in the anionic moiety;
   d. said saccharide is selected from the group consisting of dextrose, sucrose, levulose, maltose, corn syrup, and mixtures thereof.

3. The frozen dessert of claim 2 comprising in addition, a stabilizing agent, a flavoring agent, and a coloring agent.

4. A process for making a frozen dessert comprising the steps of:
 a. making an emulsion by the steps of
  1. melting from about 0.5% to about 18% of a first emulsifier selected from the group consisting of edible polyglycerol fatty acid esters and edible sorbitan fatty acid esters, with from about 0.5% to about 15% by weight of said first emulsifier of a second emulsifier which is an anionic emulsifier;
  2. dispersing without aeration the melt of step (1) with high shear and cooling, said shear and cooling being done simultaneously or in sequence, to below the melting point of said melt into an aqueous medium of at least twice the weight of said melt; and
  3. emulsifying from about 15% to about 80% of a triglyceride fat or oil into the aqueous dispersion of (2); said emulsion having a water acitvity of less than 0.80;
 b. mixing from about 10% to about 35% of said emulsion of step (a), from about 10% to about 35% of saccharides, from about 2% to about 7% of protein solids, and from about 45% to about 65% of water from aqueous fluid;
 c. aerating the mixture of step (b);
 d. freezing the aerated mixture of step (c).

5. The process of claim 4 wherein
 a. said protein solids are provided by nonfat milk solids;
 b. said edible triglyceride is selected from the group consisting of cottonseed oil, soybean oil, corn oil, peanut oil, sunflower oil, rice oil, safflower oil, palm oil, palm kernel oil, and coconut oil;
 c. said first emulsifier is selected from the group consisting of an edible polyglycerol fatty acid ester having an average of 2 to 3 glycerol units and 1 fatty acid group per polyglycerol moiety and edible sorbitan fatty acid esters having one fatty acid group per sorbitan moiety;
 d. said second emulsifier is an anionic surfactant selected from the group consisting of alkali and alkaline earth metal salts of fatty carboxylates, sulfates, sulfonates, and fatty acid lactylates and half salts of dicarboxylic fatty acid esters having from about 8 to about 20 carbon atoms in the anionic moiety;
 e. said saccharide is selected from the group consisting of dextrose, sucrose, levulose, maltose, corn syrup, and mixtures thereof.

6. The process of claim 4 wherein said aqueous fluid is selected from the group consisting of water, whole milk, 2% fat milk, skim milk, half-and-half, and cream.

7. The process of claim 4 wherein said aqueous fluid is employed at a temperature of less than about 20°C.

8. The process of claim 4 wherein a stabilizing agent, a coloring agent, and a flavoring agent are added before the step of aerating the mixture.

9. An emulsion composition useful for making a frozen dessert when contacted with from about 2% to about 7% of protein, from about 10% to about 35% of saccharides, and from about 45% to about 65% water, said emulsion composition being used at from about 10% to about 35% and being comprised of:
 a. from about 15% to about 80% of an edible triglyceride;
 b. from about 0.5% to about 18% of a first emulsifier selected from the group consisting of edible polyglycerol fatty acid esters having an average of from 2 to 10 glycerol units and from 1 to 3 fatty acid groups of from 14 to 18 carbon atoms per polyglycerol moiety and sorbitan fatty acid esters having from 1 to 3 fatty acid groups of from 14 to 18 carbon atoms per sorbitan moiety;
 c. from about 0.5% to about 15% by weight of said first emulsifier of a second emulsifier which is an edible anionic emulsifier;
 d. from about 20% to about 50% of saccharide; and
 e. from about 10% to about 35% of water.

10. The emulsion composition of claim 9 wherein
 a. said edible triglyceride is selected from the group consisting of cottonseed oil, soybean oil, corn oil, sunflower oil, palm oil, palm kernel oil, peanut oil, rice oil, safflower oil, and coconut oil;
 b. said first emulsifier is selected from the group consisting of an edible polyglycerol fatty acid ester having an average of 2 to 3 glycerol units and 1 fatty acid group per polyglycerol moiety and edible sorbitan fatty acid esters having 1 fatty acid group per sorbitan moiety;
 c. said second emulsifier is an anionic emulsifier selected from the group consisting of alkali and alkaline earth metal salts of fatty carboxylates, sulfates, sulfonates, fatty acid lactylates and half salts of dicarboxylic fatty acid esters having from about 8 to about 20 carbon atoms in the anionic moiety;
 d. said saccharide is selected from the group consisting of dextrose, sucrose, levulose, maltose, corn syrup, and mixtures thereof.

11. The emulsion composition of claim 10 which contains, in addition, a flavorant and a stabilizing agent.

12. The emulsion composition of claim 10 which contains, in addition, a monohydric or polyhydric alcohol in an amount sufficient to lower the water activity of the emulsion to 0.80 or below.

13. A process for making an emulsion composition which is useful to make a frozen dessert when contacted with additional protein and water, said process comprising the steps of:
 a. melting from about 0.5% to about 18% of a first emulsifier selected from the group consisting of edible polyglycerol fatty acid esters and edible sorbitan fatty acid esters, with from about 0.5% to about 15% by weight of said first emulsifier of a second emulsifier which is an anionic emulsifier;
 b. dispersing without aeration the melt of step (a) with high shear and cooling to below the melting point of said melt into an aqueous medium of at least twice the weight of said melt; and
 c. emulsifying from about 15% to about 80% of a triglyceride fat or oil into the aqueous dispersion of (b).

14. The process of claim 12 wherein
 a. said edible triglyceride is selected from the group consisting of cottonseed oil, soybean oil, corn oil, sunflower oil, palm oil, palm kernel oil, peanut oil, rice oil, safflower oil, and coconut oil;
 b. said first emulsifier is selected from the group consisting of an edible polyglycerol fatty acid ester having an average of 2 to 3 glycerol units and 1 fatty acid group per polyglycerol moiety and edible sorbitan fatty acid esters having one fatty acid group per sorbitan moiety;
c. said second emulsifier is an anionic emulsifier selected from the group consisting of alkali and alkaline earth metal salts of fatty carboxylates, sulfates, sulfonates, fatty acid lactylates and half salts at dicarboxylic fatty acid esters having from about 9 to 20 carbon atoms in the anionic moiety;
d. said saccharide is selected from the group consistng of dextrose, sucrose, levulose, maltose, corn syrup, and mixtures thereof.

15. An article of manufacture comprising
A. a first emulsion composition comprising:
   1. from about 15% to about 80% of an edible triglyceride;
   2. from about 0.5% to about 18% of a first emulsifier selected from the group consisting of edible polyglycerol fatty acid esters having an average of from 2 to 10 glycerol units and from 1 to 3 fatty acid groups of from 14 to 18 carbon atoms per polyglycerol moiety, and sorbitan fatty acid esters having from 1 to 3 fatty acid groups of from 14 to 18 carbon atoms per sorbitan moiety;
   3. from about 0.5% to about 15% by weight of said first emulsifier of a second emulsifier which is an edible anionic emulsifier;
   4. from about 20% to about 50% saccharide; and
   5. from about 10% to about 35% of water;
B. A second composition comprising from about 2% to about 7% of protein; from about 10% to about 35% saccharides; and from about 45% to about 65% water.

* * * * *

UNITED STATES PATENT AND TRADEMARK OFFICE
CERTIFICATE OF CORRECTION

PATENT NO. : 3,949,102

DATED : April 6, 1976

INVENTOR(S) : James Allen Hellyer, Richard Gordon Kess, Paul Seiden

It is certified that error appears in the above-identified patent and that said Letters Patent are hereby corrected as shown below:

In the Abstract, Line 2, "7%" should read -- 2% --.

In the Abstract, Line 3, "18%" should read -- 7% --.

Column 3, Between Lines 12 and 13 the subtitle -- DESCRIPTION OF THE INVENTION -- should be inserted.

Column 8, Line 10, "EXAMPLE 6 6" should read -- EXAMPLE 6 --.

Claims 4-8, Column 9 Lines 2-60, should be cancelled.

Claims 13-15, Column 10 Lines 43-68, Column 11, and Column 12, should be cancelled.

Signed and Sealed this

Ninth Day of November 1976

[SEAL]

Attest:

RUTH C. MASON
Attesting Officer

C. MARSHALL DANN
Commissioner of Patents and Trademarks